US011984680B2

(12) United States Patent
Fan et al.

(10) Patent No.: US 11,984,680 B2
(45) Date of Patent: May 14, 2024

(54) COMPACT CONNECT WITH MULTIPLE ROWS OF CONTACT TAILS

(71) Applicant: Amphenol Commercial Products (Chengdu) Co., Ltd., Chengdu (CN)

(72) Inventors: Jun Fan, Chengdu (CN); Tao Zeng, Chengdu (CN); Ki Ka Lau, Kowloon (HK)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 161 days.

(21) Appl. No.: 17/535,397

(22) Filed: Nov. 24, 2021

(65) Prior Publication Data

US 2022/0173537 A1 Jun. 2, 2022

(30) Foreign Application Priority Data

Nov. 30, 2020 (CN) ......................... 202011374976.7
Nov. 30, 2020 (CN) ......................... 202022829419.1

(51) Int. Cl.
*H01R 12/72* (2011.01)
*H01R 12/70* (2011.01)
(Continued)

(52) U.S. Cl.
CPC ....... *H01R 12/721* (2013.01); *H01R 12/7005* (2013.01); *H01R 12/727* (2013.01); *H01R 13/6461* (2013.01); *H01R 13/6581* (2013.01)

(58) Field of Classification Search
CPC ......................... H01R 12/721; H01R 12/7003; H01R 12/727; H01R 13/6461; H01R 13/6581
(Continued)

(56) References Cited

U.S. PATENT DOCUMENTS 6,435,914 B1 * 8/2002 Billman ............. H01R 13/6587 439/607.07
7,993,147 B2 8/2011 Cole et al.
(Continued)

FOREIGN PATENT DOCUMENTS

CN 106025719 B * 7/2019 ......... H01R 13/6471
CN 209313054 U 8/2019
(Continued)

OTHER PUBLICATIONS

[No Author Listed], SFF-TA-1007 Specification for Enterprise and Datacenter 1U Long SSD Form Factor. Development. Rev 0.0.1. Dec. 19, 2017. 13 pages.

*Primary Examiner* — Peter G Leigh
(74) *Attorney, Agent, or Firm* — Wolf, Greenfield & Sacks, P.C.

(57) ABSTRACT

A card edge connector for providing high-speed interconnections between different printed circuit boards. The card edge connector may include a plurality of wafers, each having a plurality of conductors. The conductors may include tails at one end and mating contact portions at an opposing end. The connector may have more rows of tails than columns of mating contact portions, so that the tails extend less distance from an edge of a PCB toward its center. The connector may be formed from multiple wafers of different sizes. Shorter wafers may have mating contact portions in columns and tails in rows. Taller wafers may have mating contact portions in the same column as a respective shorter wafer and tails in a row parallel to and offset from the row of tails of the respective shorter wafer.

26 Claims, 7 Drawing Sheets

(51) Int. Cl.
*H01R 13/6461* (2011.01)
*H01R 13/6581* (2011.01)

(58) Field of Classification Search
USPC ............................................................ 439/59
See application file for complete search history.

(56) References Cited

U.S. PATENT DOCUMENTS

| | | | | |
|---|---|---|---|---|
| 9,257,778 | B2 * | 2/2016 | Buck | H01R 13/516 |
| 9,312,965 | B2 | 4/2016 | Iemura et al. | |
| 9,490,587 | B1 * | 11/2016 | Phillips | H01R 13/6587 |
| 9,531,130 | B1 * | 12/2016 | Phillips | H01R 13/6471 |
| 9,537,239 | B1 * | 1/2017 | Liu | H01R 13/6587 |
| 9,666,998 | B1 * | 5/2017 | de Boer | H01R 13/6596 |
| 9,748,681 | B1 * | 8/2017 | Champion | H01R 12/732 |
| 9,825,391 | B2 * | 11/2017 | Cohen | H01R 13/04 |
| 9,923,309 | B1 * | 3/2018 | Aizawa | H05K 1/113 |
| 10,276,985 | B1 | 4/2019 | Liu et al. | |
| 10,553,968 | B2 * | 2/2020 | Consoli | H01R 12/727 |
| 2004/0242036 | A1 * | 12/2004 | Schempp | H01R 12/7005 439/108 |
| 2005/0042893 | A1 | 2/2005 | Debord et al. | |
| 2010/0217909 | A1 | 8/2010 | Pavol et al. | |
| 2012/0214344 | A1 * | 8/2012 | Cohen | H01R 13/04 439/660 |
| 2014/0268536 | A1 | 9/2014 | Herman et al. | |
| 2014/0335735 | A1 * | 11/2014 | Cohen | H01R 13/04 439/626 |
| 2016/0285204 | A1 * | 9/2016 | Morgan | H01R 13/6471 |
| 2018/0248289 | A1 * | 8/2018 | Cohen | H01R 13/04 |
| 2019/0104632 | A1 | 4/2019 | Nelson et al. | |
| 2019/0334292 | A1 * | 10/2019 | Cartier, Jr. | H01R 13/518 |
| 2020/0212636 | A1 * | 7/2020 | Chang | H01R 13/6474 |
| 2020/0266585 | A1 * | 8/2020 | Paniagua | H01R 13/652 |
| 2022/0216652 | A1 | 7/2022 | Chen et al. | |

FOREIGN PATENT DOCUMENTS

| | | | | | |
|---|---|---|---|---|---|
| DE | 10310502 | A1 * | 9/2004 | | H01R 12/7005 |
| JP | 2003151690 | A * | 5/2003 | | H01R 23/688 |

* cited by examiner

COMPACT CONNECT WITH MULTIPLE ROWS OF CONTACT TAILS

CROSS-REFERENCE TO RELATED APPLICATIONS

This application claims priority to and the benefit of Chinese Patent Application Serial No. 202022829419.1, filed on Nov. 30, 2020, entitled "COMPACT CONNECTOR." This application also claims priority to and the benefit of Chinese Patent Application Serial No. 202011374976.7, filed on Nov. 30, 2020, entitled "COMPACT CONNECTOR." The entire contents of these applications are incorporated herein by reference in their entirety.

FIELD

Apparatus and methods are disclosed for a compact connector such as a card edge connector that may connect a card to a printed circuit board at the periphery of the printed circuit board while occupying a small area of the printed circuit board that might otherwise be used for functional components.

BACKGROUND

Electrical connectors are used in electronic systems to connect circuitry on one printed circuit board (PCB) to circuitry on another PCB. For some systems, it may be easier and more cost effective to manufacture the majority of the system's circuitry on separate electronic assemblies, such as PCBs, which may be joined together with electrical connectors. A common example of this is memory cards that plug into electrical connectors on a personal computer's motherboard.

In servers and other powerful computers multiple memory cards may be connected to the same motherboard. The memory cards may contain solid state memory and may serve as solid state drives. In some systems, for example, the memory cards may be orthogonal to the motherboard, and aligned in parallel along an edge of the motherboard. Such a configuration is described in an industry standard SFF-TA-1007.

Card edge connectors are configured to support this configuration, as they may be mounted to a PCB and mated with an add-in card, such as a memory card. A card edge connector may have a mating interface with a slot sized to receive an edge of the add-in card. Conductors, with a mating contact at one end and a tail at the other end, may pass through a connector from the slot to a mounting interface. At the mounting interface the tails may be attached to the PCB. At the mating interface, the mating contacts may be exposed in the slot, where they can make electrical contacts to pads on an edge of the add-in card inserted into the slot.

A conventional card edge connector has two columns of mating contact portions, one on each side of the slot. The tails of the conductors are similarly arrayed in two rows along the PCB.

SUMMARY

Some embodiments relate to connectors that may be used to connect add-in cards to a PCB. In some embodiments, a connector may connect the add-in card in an orthogonal orientation to the PCB, and may be configured as an orthogonal connector. The connector may be configured as a multi-row connector that has more rows of tails that connect to the PCB at one side or end of the connector than columns of mating contact portions at another side or end of the connector that connect to the add-in card.

Some embodiments relate to a connector for mounting to a peripheral region of a printed circuit board. The connector may comprise a plurality of conductors, each conductor comprising a tail configured for connection to the printed circuit board when the connector is attached to the printed circuit board and a mating contact portion. The mating contact portions of the plurality of conductors may be arranged in M columns configured to extend perpendicularly from a surface of the printed circuit board when the connector is attached to the printed circuit board, and the tails of the plurality of conductors may be arranged in N rows positioned for connection to mating features on the printed circuit board, wherein N and M are integers and Nis greater than M.

Some embodiments relate to an electronic system comprising a printed circuit board, a card having contact pads on one or more surfaces, and a connector mounted to a peripheral region of the printed circuit board and configured to electrically connect circuitry on the card to circuitry on the printed circuit board. The connector may comprise a plurality of conductors, wherein each conductor comprises a tail configured for connection to the printed circuit board and a mating contact portion. The mating contact portions of the plurality of conductors may be arranged in M columns configured to extend perpendicularly from a surface of the printed circuit board, and the tails of the plurality of conductors may arranged in N rows and connect to mating features on the printed circuit board, wherein N and M are integers and N>M.

Some embodiments relate to a method of assembling a connector that mounts to a peripheral region of a printed circuit board. The method may comprise acts of locating a first row of tails of a first wafer alongside a second row of tails of a second wafer; aligning first mating contact portions of the first wafer that connect to the first row of tails in a same column as second mating contact portions of the second wafer that connect to the second row of tails, wherein the first wafer has a first shape and the second wafer has a second shape different from the first shape; and retaining the first wafer and the second wafer with a housing of the connector.

Some embodiments relate to a connector for connecting a card to a peripheral region of a printed circuit board. The connector may comprise a first wafer having a first shape and a first plurality of conductors that extend perpendicularly from a surface of the printed circuit board when the connector is attached to the printed circuit board, and a second wafer having a second shape that is different from the first shape and having a second plurality of conductors arranged to extend perpendicularly from the surface of the printed circuit board when the connector is attached to the printed circuit board. The conductors of the first and second wafers may comprise tails configured for connection to the printed circuit board and mating contact portions, wherein a first plurality of the mating contact portions connected to at least a portion of the first plurality of conductors are aligned in a front housing of the connector with a second plurality of the mating contact portions connected to at least a portion of the second plurality of conductors.

Some embodiments relate to a wafer for a connector that mounts to a peripheral region of a printed circuit board. The wafer may comprise a plurality of conductors that each comprise a tail configured for connection to the printed circuit board when the connector is attached to the printed circuit board and a mating contact portion. The mating contact portions may lie in a first plane and are arranged to extend perpendicularly from a surface of the printed circuit board when the connector is attached to the printed circuit board. The tails may lie in a second plane that is parallel to and offset from the first plane.

Some embodiments relate to a connector comprising a plurality of conductors, wherein each conductor comprises a tail configured for connection to a printed circuit board when the connector is attached to the printed circuit board and a mating contact portion. The mating contact portions may lie along a first line that extends perpendicularly from a surface of the printed circuit board when the connector is attached to the printed circuit board. A first plurality of the tails may be configured for connection to the surface of the printed circuit board along a second line, and a second plurality of the tails may configured for connection to the surface of the printed circuit board along a third line that is different than the second line.

Some embodiments relate to a connector comprising a plurality of conductors having tails and mating contact portions at opposing ends and two or more rows of the tails that are arranged side-by-side. The tails two or more rows of tails may be configured for connection to a printed circuit board. The mating contact portions may be arranged in one column that extends vertically from a surface of the printed circuit board when the connector is attached to the printed circuit board.

The foregoing and other aspects, embodiments, and features of the present teachings can be more fully understood from the following description in conjunction with the accompanying drawings.

BRIEF DESCRIPTION OF THE DRAWINGS

The figures, described herein, are for illustration purposes only. It is to be understood that in some instances various aspects of the utility model may be shown exaggerated or enlarged to facilitate an understanding of the utility model. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1A:
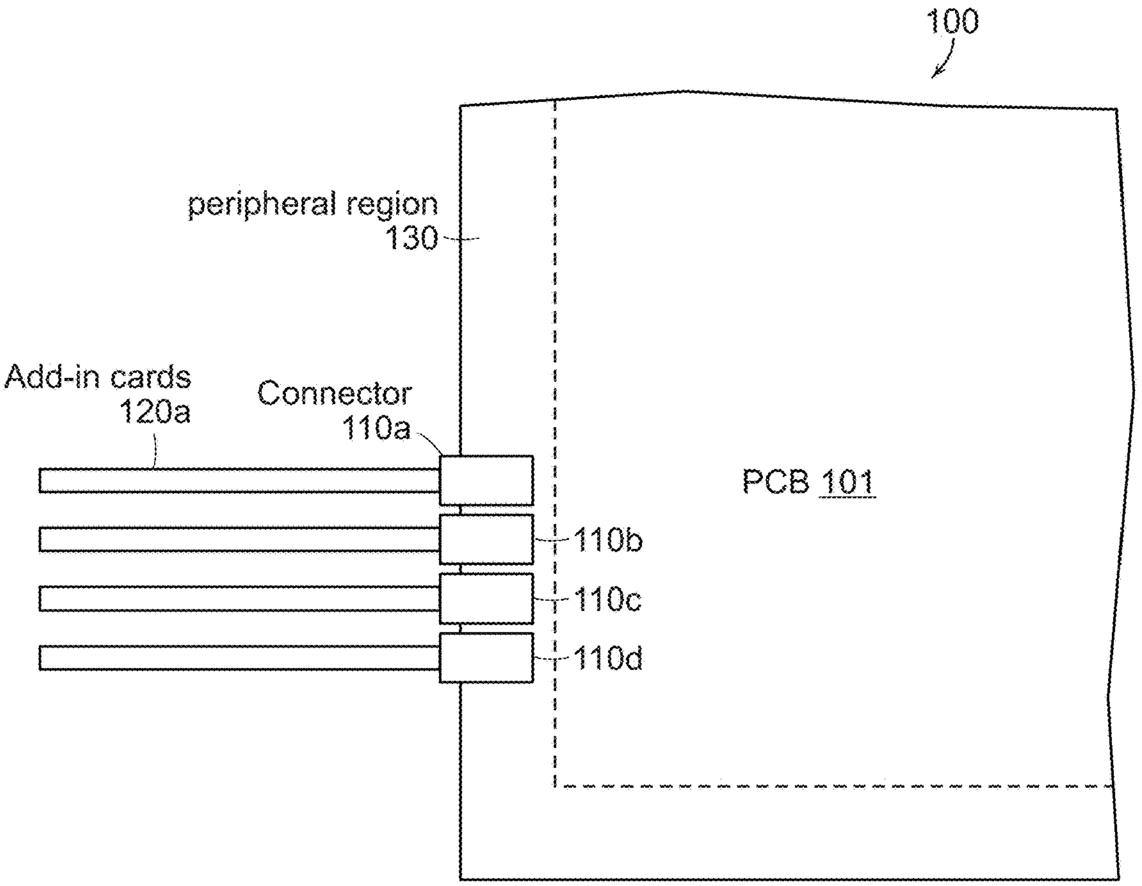
FIG. 1A is a top plan view of an example application of a card edge connector, in which card edge connectors according to some embodiments, are mounted in a peripheral region of a PCB for connection of multiple add-in cards to the PCB.

The features and advantages of the present utility model will become more apparent from the detailed description set forth below when taken in conjunction with the drawings.

DETAILED DESCRIPTION

The inventors have recognized and appreciated designs for a connector that enables economical implementation of systems that require connectors with a large number of interconnects. Such a connector may have a mating interface with a large number of mating contact portions, but the connector, when mounted to a printed circuit board (PCB), may only occupy an area that extends a relatively small distance from the edge of the PCB. Such a connector may have a mating interface with one or more columns, each with a large number of mating contact portions of conductors. The contact tails for the conductors of each of one or more columns may be arranged in multiple rows, each of which extends from the edge towards the periphery of the PCB a distance that is less than the length of the column of mating contact portions. Such a connector may have a footprint that occupies less distance from the edge than a conventional footprint for a similar number of conductors of the same pitch. As a result, the connector footprint occupies less of the area of the PCB where functional components may be mounted, enabling a smaller, and therefore lower cost, PCB to be used.

When configured as a card edge connector, such connectors may enable economical system architectures for integrating powerful add-in cards in a server or other computer system. In some embodiments, a connector may be configured as a card edge connector and one or more such connectors may be mounted in a relatively small peripheral region along an edge of a PCB of the server or other computer system. Such a connector may have a mating interface that has at least one column of mating contacts designed to mate with pads on a surface of an add-in card, such as a memory card. As a relatively large number of mating contact portions may be provided, a large memory array may be connected to the PCB, while enabling a relatively small and low-cost PCB to be used.

In some embodiments, multiple such connectors may be mounted along the edge of the PCB. A system, for example, may have a PCB serving as a mother board, with multiple add-in cards, each of which holds a large number of non-volatile memory chips. The connectors may enable a relatively large memory array to be connected to the components on the motherboard. The memory array may serve, for example, as a solid-state drive.

The memory cards may be spaced from each other in the direction of the edge of the PCB to ensure an adequate flow of cooling air in the system. As the connectors are conventionally spaced on the same pitch as the memory cards, in a system implemented with conventional connectors, the connectors may be separated by regions of the PCB. Those regions of the PCB may be largely unused, as they are neither occupied by the connector footprint nor used for functional components mounted to the PCB. With a connector design as described herein, however, the area of the unused regions of the PCB between connectors may be less, as multiple rows of contact tails per column of mating contact portions results in a wider connector footprint. In this way, unused space between connectors is used to lessen the distance into the PCB that the connector footprint extends, enabling a smaller and lower cost PCB to be used.

The connector may itself also have an economical design. In some embodiments, the connector may be implemented with wafers. Each wafer may include multiple conductors. The contact portions and the tails of those conductors may each be held in a line. In a conventional connector design, the line of mating contact portions may form a column at the mating interface, and the line of contact tails may form a row at the mounting interface. In some embodiments, the line of mating contact portions for each wafer may form a portion of a column at the mating interface. For example, two wafers may be aligned with their mating contact portions colinear, such that the mating contact portions of the two wafers together form one column of mating contact portions at the mating interface. The contact tails for those two wafers may be non-colinear. Rather, the contact tails may be arranged in two lines that are parallel but offset in the direction of the edge of the PCB, such that the two wafers provide two rows of contact tails at the mounting interface of the connector.

In some embodiments, a first wafer that makes up a portion of a column of mating contact portions may be configured for forming a connector with a shorter column of mating contact portions. A second wafer that makes up a portion of that column of mating contact portions may be configured to conform to the outer perimeter of the first wafer. In this way, the first wafer may be used either in a connector with a shorter column of mating contact portions or a longer column of mating contact portions. Enabling wafers of the same configuration to be used in connectors of two different lengths reduces the total cost of tooling for the longer and shorter connector, which makes both connectors more economical to manufacture.

For example, as electronic systems become more advanced, more channels and/or processing functionalities may be added, which may lead to additional interconnect paths between PCBs. For example, the amount of circuitry and circuit density on a system's midplane, backplane, or motherboard may increase and may require additional off-board interconnections. In some cases, the midplane, backplane, or motherboard may be constrained in size (e.g., to fit into standardized server cabinets or other package) though the add-in cards may increase in size. In some embodiments of the connectors described herein, wafers used for add-in cards of one size may be re-used in connectors that mate with larger add-in cards.

Internet servers and routers are examples of data-handling systems that may support multiple high data-rate channels. Data transmission rates for each channel in such systems may be up to and well over 10 gigabit/sec (Gb/s). In some implementations, data rates may be as high as 150 Gb/s, for example. In some embodiments, connectors as described herein may be capable of carrying data for multiple such high-speed data channels.

Figure 1B:
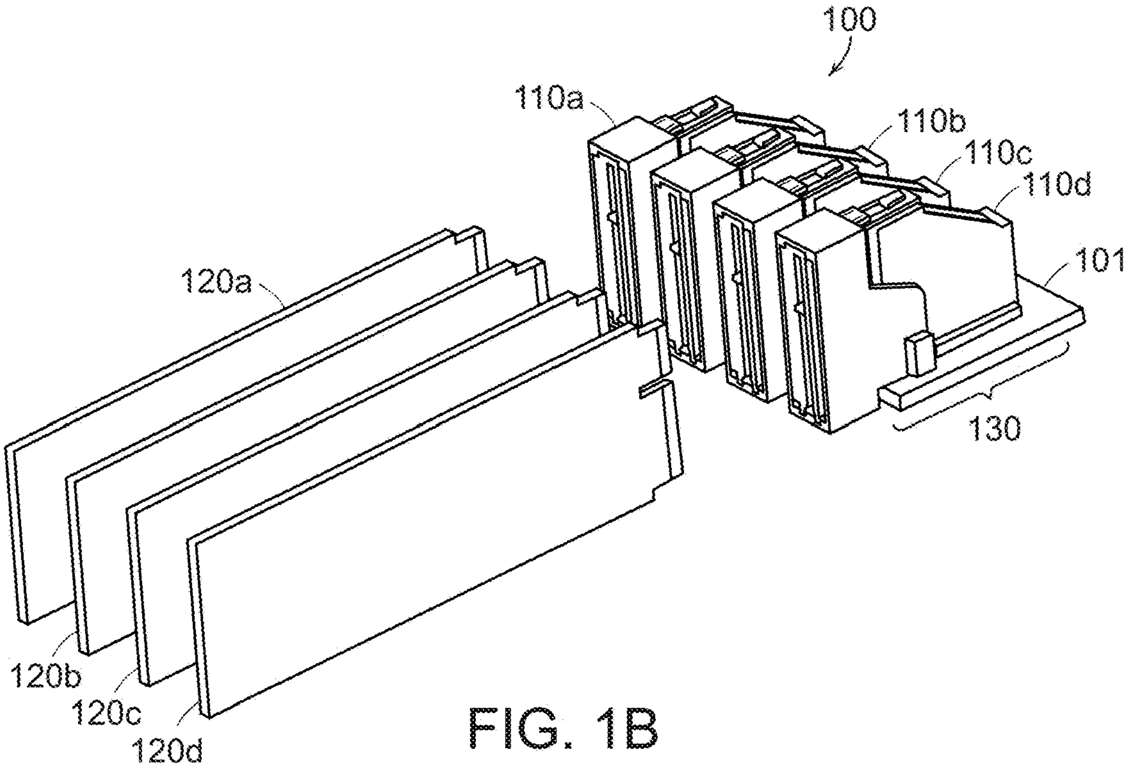
FIG. 1B is a front side view of the portion of a system illustrated in FIG. 1A.

An example system 100 where such multi-row connectors may be used is depicted in FIGS. 1A and 1B, according to some embodiments. The illustrated system 100 shows five PCBs and may be part of a server, for example. One of the PCBs 101 (a portion of which is shown) may be a motherboard of a server and may include circuitry and patterned conductors on one or more levels of the PCB. The system 100 may also include one or more card edge connectors 110*a* to 110*d* that receive add-in cards 120*a* . . . 120*d*. The connectors 110*a* to 110*d* may be located in a peripheral region 130 of the PCB 101 and provide a plurality of interconnect paths between the PCB 101 and the add-in cards 120*a* to 120*d*. For the configuration shown in FIGS. 1A and 1B, the connectors may be referred to as "orthogonal" connectors since the connected add-in cards 120*a* to 120*d* have their circuit planes or broad surfaces oriented orthogonal to the circuit plane(s) of the PCB 101. According to some implementations, the PCB 101 and add-in cards 120*a* to 120*d* may be assembled in a support frame or enclosure to fit into one standard unit (1U) of an information technology (IT) equipment rack (approximately 1.75 inches high for a 19-inch-wide or 23-in-wide equipment rack). The add-in cards may contain non-volatile memory chips and may be used in the system as solid-state drives (SSDs).

In some implementations, such multi-row connectors 110 may conform to industry standards or specifications in some cases, such as the small form factor (SFF) specifications. As just one example, a card edge connector may receive cards that conform to the SFF-TA-1007 specification. The specification may specify a number, arrangement, and spacing of contact pads on an add-in card that electrically connect to contacts on the multi-row connector. In some embodiments, the center-to-center spacing between contact pads on the add-in cards 120 may be 0.6 millimeters (mm), though other spacings may be used in other embodiments. For the SFF-TA-1007 specification, there may be between 56 and 84 contact pads (or between approximately those values) divided between two sides of the add-in card. In some cases, there may be more contact pads on the cards to which the connector may provide mating contacts.

A specification may also specify a spacing between the add-in cards 120, which may be used for air flow between the cards, according to some embodiments. In some implementations, there may be fans on the PCB that move air between the add-in cards 120. In some embodiments, there may be more than one spacing between cards that are specified. The fans may be oriented to blow air from right to left or left to right in FIGS. 1A and 1B, for example. The different spacings may be for different levels of power drawn by different add-in cards (e.g., at least 9.5 mm center-to-center spacing for up to 25 watts and at least 18 mm center-to-center spacing for up to 40 watts).

The inventors have further recognized and appreciated that it may be beneficial to make connectors compatible with different types of cards (e.g., versions of add-in cards 120 with fewer or more contact pads that connect to mating contacts in the connectors 110*a* to 110*d* when the cards 120*a* to 120 dare plugged into the connectors 110*a* to 110*d*. Additionally, it may be beneficial if the connector's length does not exceed a maximum length (in a direction perpendicular to the edge of the PCB to which the connector is mounted) of prior versions of the connector, so that the connectors 110*a* to 110*d* may fasten into a same peripheral region of a PCB 101 as a prior version of the connector. In some embodiments, it may be beneficial if the connectors 110*a* to 110*d* extend less distance toward a center of the PCB 101 than prior versions of the connector.

Figure 2A:
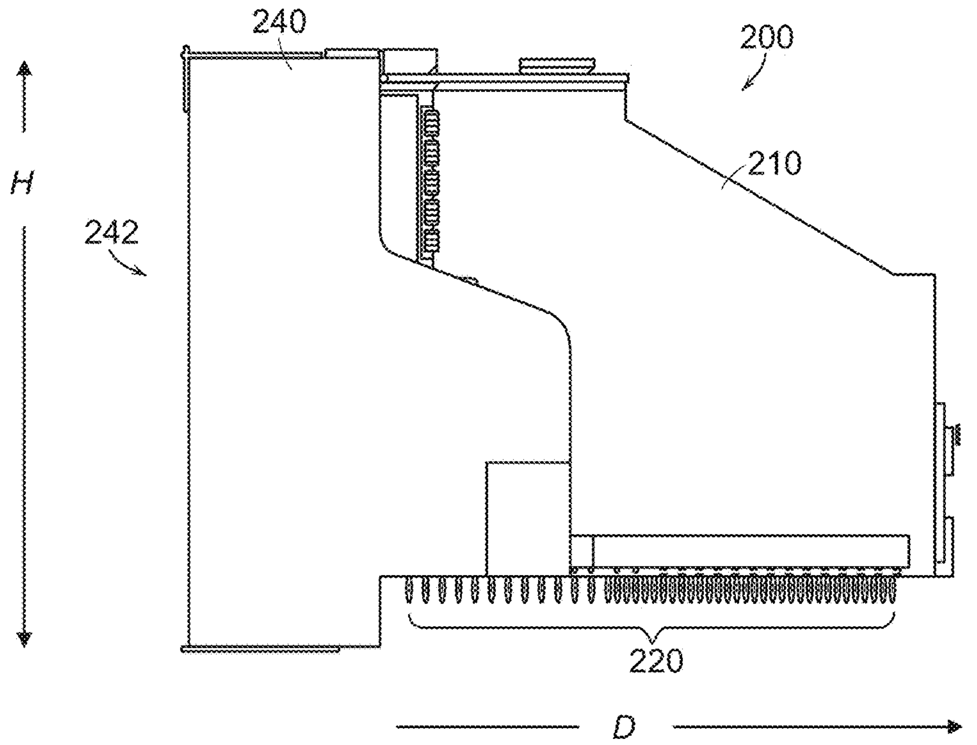
FIG. 2A is an elevation side view of an exemplary card edge connector, according to some embodiments.

FIG. 2A depicts a side elevation view of a card edge connector 200, which may be used as any one of the connectors 110*a* to 110*d*. Card edge connector 200 may be configured to accommodate a large number of interconnect paths between PCBs and extend a distance D, which in some embodiments may extend no further than 35 mm, or approximately this value, from an edge of a PCB. According to some embodiments, the tails 220 may be within an area that extends no more than 32 mm from an edge of the PCB. In some cases, this distance is the same as or less than a distance to which a previous version of the connector extends, the previous version containing fewer interconnect paths.

For example, a card-edge connector may provide a total of 84 mating contact portions arranged in two columns at the mating interface. The tails may occupy an area extending 32 mm or less from the edge of the PCB. Such a connector may have a contact density of greater than 2.5 contacts per mm of board length. A conventional right-angle connector for orthogonal connection of an add-in card with contacts on the same pitch may fit only 56 contacts per 32 mm, resulting in a contact density of less than 2 contacts per mm. Moreover, the contact density for a conventional design is the same for the same pitch, whereas, in a multi-row connector as described herein the contact density may increase by increasing the number of rows, and may be 2 or more contacts per mm.

The connector 200 may include a connector body 210 through which multiple conductors pass. Connector body 210 may be formed from multiple wafers. In this example, body 210 is formed with four wafers 250*a*, 250*b*, 250*c* and 250*d* (identified in FIG. 2B). The wafers 250*a* to 250*d* each may include a plurality of conductors that each have a tail 220 at one end, forming a mounting interface, and one or more mating contact portions 230 (visible in FIG. 4A) at an opposite end, forming a mating interface 242. In this example, mating interface 242 comprises two columns of mating contact portions, positioned on opposite sides of slot into which an edge of an add-in card, such as one of add-in cards 120*a* to 120*d*, may be inserted. The mating contact portions may be positioned such that pads on the add-in card mate with the mating contact portions of the connector.

The mating interface 242 may be within an outer housing 240. Outer housing 240 may be metal, such as die cast aluminum or a machined part, for example. Outer housing 240 may provide mechanical support for connector body 210. A total height H of the connector may be less than 40 mm, or approximately this value, according to some embodiments. According to some implementations, the total height H may be between 30 mm and 42 mm or between approximately these values, such that the connector may be used with assemblies that fit into one standard unit of an IT equipment rack. In alternative embodiments, the height may be greater than 42 mm.

The tails 220 shown in FIG. 2A may be press-fit tails that press into conductive vias in a PCB. In alternative embodiments, the tails may be surface-mount tails that solder to contact pads on a PCB. There may be between 40 tails and 150 tails 220 arranged in two or more rows extending from a connector 200. In some cases, there may be a number of tails 220 extending from connector that complies with a standard, such as 56, 84, or 140.

Figure 2B:
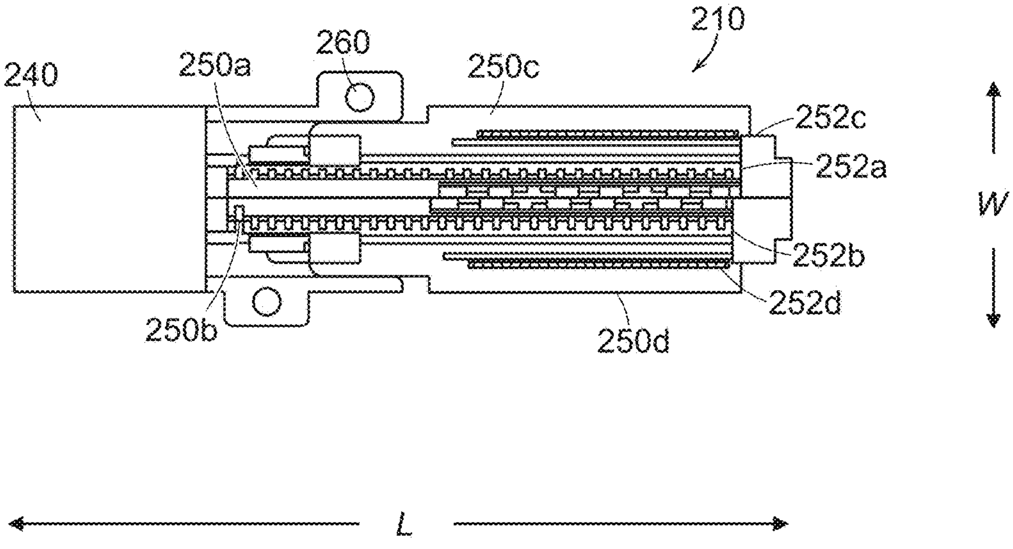
FIG. 2B is a bottom plan view of the card edge connector of FIG. 2A.

FIG. 2B depicts a bottom view of the connector 200 of FIG. 2A. According to some embodiments, there may be a plurality of wafers forming connector body 210. For the illustrated example, there are four wafers 250*a* to 250*d*, but there could be fewer or more than four wafers in alternative embodiments. In this example, the tails of each of the wafers are aligned in a row, such that the four wafers 250*a* to 250*d* provide four rows 252*a*, 252*b*, 252*c* and 252*d* of tails. The rows are parallel to each other and offset in a direction of an edge of a PCB to which connector 200 may be mounted. In this example, row 252*a* and 252*b* are the same length. Rows 252*c* and 252*d* are the same length, which is shorter than the length of rows 252*a* and 252*b*.

In this example, the four rows 252*a*, 252*b*, 252*c* and 252*d* form a connector footprint for a large number of connections, such as 84 connections. Rows 252*a* and 252*b* have a footprint that may match the footprint of a conventional connector configured for fewer connections, such as 56 connections. In some embodiments, wafers 250*a* and 250*b* may be wafers used in the manufacture of a conventional connector that supported the smaller number of connections. Wafers 250*c* and 250*d* may be configured to be mounted against wafers 250*a* and 250*b*, so as to create a connector supporting a larger number of connections, without extending the length of the mounting interface for the connector.

One or more of the wafers may interlock with or otherwise be secured to one or more of the other wafers so as to provide a mechanically robust connector body 210. For example, posts, latches or other projections from one wafer may extend into holes in another wafer. Such features may cooperate to form an interference fit, snap fit or otherwise hold the wafers together. Alternatively or additionally, a clip or other fastener may be applied to two or more wafers to hold them together. In this example, wafers 250*a* and 250*b* may be fastened to one another. Wafers 250*c* and 250*d* may also be fastened to one another, with wafer 250*c* fastened to wafer 250*a* and wafer 250*d* fastened to wafer 250*b*.

Connector 200 may also include one or more mounting features 260 that allow the connector to be fastened to a PCB. In this example, the mounting feature is formed as a portion of the outer housing 240. Examples of mounting features include, but are not limited to, clear or threaded holes for screws, bolts or snap-in pins, openings for snap-in structures, compliant pins for press fitting into receiving holes on the PCB, snap-in pins, or snap-in structures. The total width W of the connector may be between 8 mm and 12 mm, or between approximately these values. The total length L of the connector may be between 40 mm and 48 mm, or between approximately these values.

Figure 3:
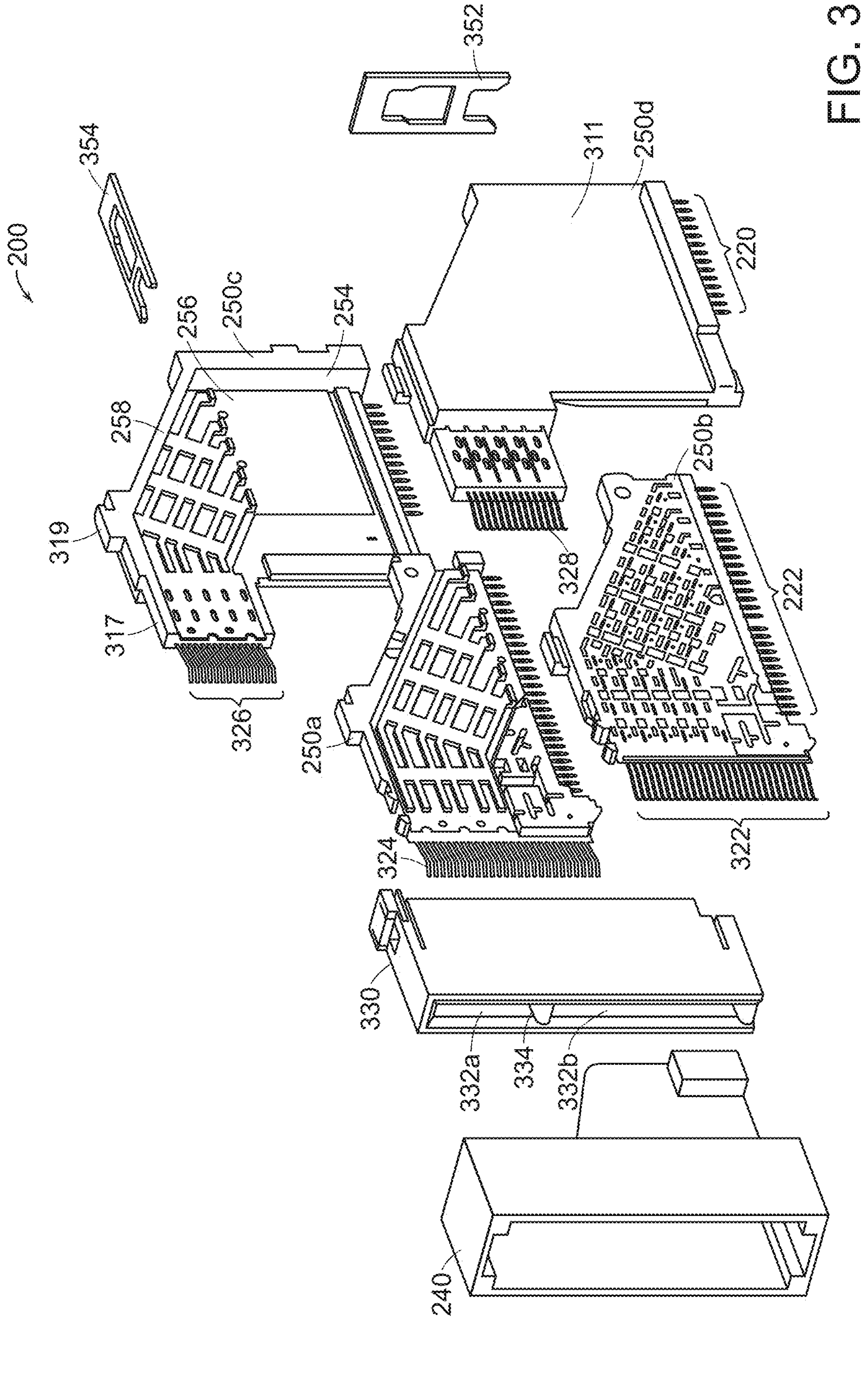
FIG. 3 is an exploded view of the card edge connector of FIG. 2A.

An exploded view showing example components of a card edge connector 200 is illustrated in FIG. 3. In this example, connector 200 includes a plurality of wafers, here shown as wafers 250*a*, 250*b*, 250*c*, 250*d*, a front housing 330, retainers 352, 354, and an outer housing 240. Some of the wafers may have essentially a same overall size and shape, and yet have a different size and shape from other wafers in the connector 200. The wafers may be of different sizes such that the mating contact portions and the tails of the conductors are in a different number of lines at the mating and mounting interfaces. There may be a first plurality of wafers 250*a*, 250*b* having a first size and shape and a second plurality of wafers 250*c*, 250*d* having a second size and shape that is different from the first size and shape. In some implementations, the wafers of a same size and shape may have a handedness (e.g., left or right handedness) or essentially comprise two mirror versions of each other. Wafers that are the mirror image of one another, may be assembled into connector body 210 such that contact surfaces of their mating contact portions face one another. In this way, the mating contact portions may line two opposing sides of a slot in mating interface 242 so as to make contact to pads on two sides of the add-in card inserted into the slot.

In this embodiment, outer wafers 250*c*, 250*d* may be taller and may be located on an outside edge of the stack of wafers have a flat and/or smooth surface 311 that is exposed to user handling and visible to a user. Wafers 250*a* and 250*b* may be shorter and may be located at the inner portion of the stack of wafers. According to some embodiments, the flat or smooth surface may be formed when insulative material is over-molded on a lead frame.

In some embodiments, some of the wafers 250*c,* 250*d* may have a greater height than adjacent wafers 250*a,* 250*b.* A portion 317 of the taller wafers from which mating contact portions extend may be offset relative to a portion of the same wafers from which the tails extend. The offset portion 317 may extend over an adjacent wafer 250*a* when the wafers are assembled together in a connector 200. For example, the offset portion 317 may be located directly over the adjacent wafer. The mating contact portions of each of the taller wafers 250*c* and 250*d* may align with the mating contact portions of respective shorter wafers 250*a* and 250*b*. In this way, the mating contact portions of a taller wafer and a shorter wafer may each form a portion of a column of mating contact portions at the mating interface of the connector. In some embodiments, there may be one or more portions on a first wafer that extend over or fit at least partially around an adjacent wafer, such that the adjacent wafer is cradled, at least in part, by the first wafer.

According to some embodiments, some of the wafers may be of a size and shape that is useful for a version of a connector containing fewer interconnects. For example, two wafers 250*a,* 250*b* may be assembled together in a connector having fewer tails 222 and mating contact portions than a connector containing additional wafers 250*c,* 250*d.* Such a connector may be suitable for add-in cards having 56 contact pads, for example. The connector containing fewer tails and mating contact portions may be compatible with pre-existing add-in cards and printed circuit boards. In some cases, pre-existing wafers may be used for some of the wafers 250*a*, 250*b,* so that these wafers do not need to be designed and developed or manufactured with new tooling to build a larger connector. Regardless of whether wafers of a pre-existing design are used, a card edge connector for an add-in card may be made available with different numbers of interconnects by assembling different numbers of wafers into a connector. Moreover, the wafers may be configured so as to limit the distance D by which the mounting interface extends from the edge of a PCB. In some embodiments, the distance D that tails extend into a PCB may not change, even though the number of interconnects is increased. Different sized front housing 330, outer housing 240, and retainers 352, 354 may be used depending on the number of wafers assembled in a group for a card edge connector 200.

Each of the wafers 250*a,* 250*b,* 250*c,* 250*d* may include a plurality of conductors supported by one or more layers of material (as described further below). The conductors may include tails 220, 222 at one end that that are configured to connect to a PCB and mating contact portions 322, 324, 326, 328 at an opposite end that contact pads of an add-in card. The tails 222 of a wafer 250*b* may lie along a line and form a row of tails in the card edge connector 200. There may be a different number of tails 222 extending from wafer 250*a* than the number of tails 220 in another wafer 250*c,* although some embodiments may have a same number of tails on each wafer. There may be two or more rows of tails lying side-by-side when the wafers are assembled in a connector 200.

There may be a different number of mating contact portions 324 or 322 extending from one wafer 250*a* or 250*b* than the number of mating contact portions 326 or 328 extending from another wafer 250*c* or 250*d,* although some embodiments may have a same number of mating contact portions on each wafer. The mating contact portions may be shaped, compliant, and have a handedness, such that they slide over and press against opposing sides of an add-in card.

The mating contact portions may extend from a front of a wafer, lie along a line, and form at least a portion of a column of mating contact portions. There may be mating contact portions 326 that extend from an offset portion 317 of a wafer 250*c,* such that these mating contact portions align in a same column with mating contact portions 324 of an adjacent wafer 250*a* when the wafers are assembled in a connector 200. According to some embodiments, the mating contact portions 326 of a wafer 250*c* may lie along a first line and the tails of the same wafer 250*c* may lie along a second line. Extensions of the first line and second line may cross but be offset from each other by a distance at their closest approach. The offset distance may be between 1 mm and 8 mm or may be between 1 mm and 4 mm in some cases. In some embodiments, a larger offset distance may be used.

Wafers 250*b* and 250*d* may have a similar configuration. Mating contact portions 328 may align with mating contact portions 322, forming a column of mating contact portions at the mating interface of the connector According to some embodiments, there may be fewer columns of mating contact portions in a connector 200 than rows of tails. For example, even though there may be three or more wafers in a connector, the mating contact portions from the wafers may align into two columns of mating contact portions that slide over and press against opposing surfaces of an add-in card. The tails of each wafer, however, may be in a separate row at the mounting interface for the connector.

A connector 200 may include one or more components that retain the wafers together in the connector. Examples of such components include, but are not limited to, retainers, such as clips 352, 354. Other components may alternatively or additionally hold the wafers together. Such components may include a front housing 330, and an outer housing 240. Metal or plastic clips 352, 354 may fit over protruding features 319 on two or more wafers to hold two or more wafers together. Metal or plastic clips may clip around some or all of the wafers to hold two or more wafers together, according to some embodiments. In some embodiments, corrosion-resistant metal or metal with a corrosion-resistant coating may be used for the clips and/or retainers. Example metals include stainless steel, steel alloys, chrome-plated steel, aluminum, chrome-plated aluminum, aluminum alloys, copper, chrome-plated copper, copper alloys, etc. Any suitable plastic or reinforced plastic may be used for the clips or retainers in some cases. A plastic may be reinforced with glass, carbon, or metal fibers in some cases. The clips 352, 354 may be stamped, cut, or molded, in some embodiments.

The front housing 330 may be formed from a plastic or reinforced plastic. Examples of suitable materials include, but are not limited to, liquid crystal polymers (LCPs), polyphenyline sulfide (PPS), high temperature nylon or polyphenylenoxide (PPO) or polypropylene (PP). Other suitable materials may also be employed. A plastic may be reinforced with glass, carbon, or metal fibers in some cases. According to some embodiments, the front housing 330 is molded and includes one or more central cavities 332*a* or 332*b* into which front ends and mating contact portions of the wafers are inserted. The one or more cavities may be aligned and/or elongated to form a slot into which an edge of an add-in card may be inserted.

One or more ribs 334 may span the slot, dividing the slot into sub-regions, such as cavities 332*a* and 332*b.* In this example, the mating contact portions of shorter wafers are inserted into front housing 330 so as to be exposed in surfaces of front housing 330 bounding cavity 332*b.* The mating contact portions of longer wafers are inserted into front housing 330 so as to be exposed in surfaces of front housing 330 bounding cavity 332*a*.

There may be alignment and/or retaining features that align and hold the wafers 250 within the front housing. For example, there may be two or more slots into which two or more wafers slide and are held securely by an interference fit. The front housing may be retained in the outer housing 240 when the connector is assembled, as a result of a snap fit features, interference fit features or other retention features.

The outer housing 240 may be formed from any suitable metal(s), according to some embodiments, such as stainless steel, steel alloys, chrome-plated steel, aluminum, chrome-plated aluminum, aluminum alloys, copper, chrome-plated copper, copper alloys, etc. Other metals or metal composition may also be used. In some embodiments, the outer housing 240 may be formed of die cast metal. When formed from a metal, the outer housing may comprise one or more stamped, machined, and/or die cast pieces. In some cases, the outer housing 240 may be formed from a plastic, a conductive plastic, or a plastic which has been made conductive and/or reinforced by additives, such as carbon, carbon fibers, glass fibers, or metal fibers. In some implementations, the outer housing 240 may comprise an insulative plastic and a conductive coating over the insulative plastic. Mounting features 260 may be located on the outer housing 240, according to some embodiments.

The illustrations of FIG. 4A through FIG. 4E show further details of example components that may be included in a wafer 250 of a card edge connector 200, according to some embodiments. Wafers may be formed by insert molding one or more types of material around a lead frame with multiple conductors so as to form a housing around intermediate portions of conductors. In the illustrated embodiment, the wafer housings are formed of insulative material and lossy plastic. Generally planar shields are attached to the housings.

Figure 4A:
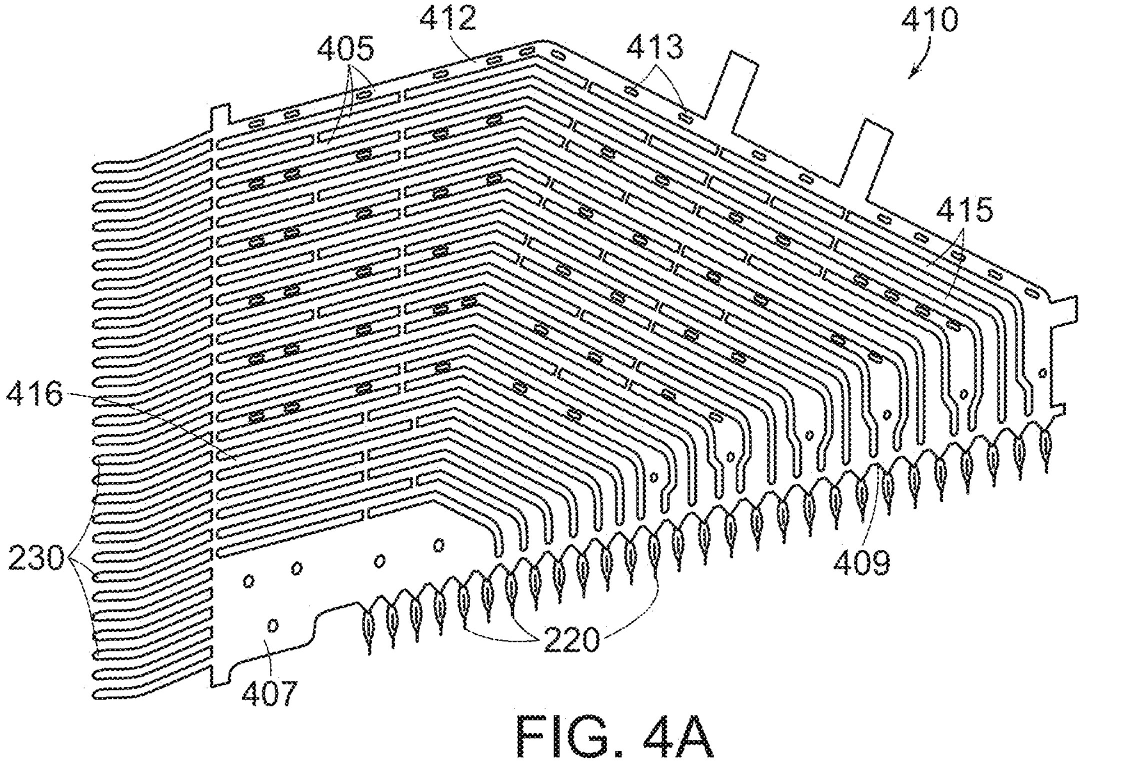
FIG. 4A is a front side view of an exemplary lead frame having a plurality of conductors that may be used in manufacture a card edge connector such as the card edge connector of FIG. 2A.

FIG. 4A depicts a lead frame 410 that includes a plurality of conductors 405. Conductors provide a plurality of electrical paths between PCBs which are connected by the card edge connector 200. The conductors 405 may include tails 220 at one end and mating contact portions 230 at an opposing end. Lead frame 410 has conductors with a number and shape of conductors suitable for use in the manufacture of wafer 250*a*. A similar, though mirror image, lead frame may be used in the manufacture of wafer 250*b*.

There may be different types of conductors 405 within the lead frame 410. For example, there may be reference conductors 412, which may be wider than some other conductors. In some cases, the reference conductors 412 may include openings 413 that allow material to pass through the reference conductors 412 during an insert molding operation. The reference conductors 412 may be designed to be connected to a reference potential, such as ground. Some conductors may be differential pairs 415. The pairs 415, for example, may be located between and immediately adjacent two reference conductors 412. Differential pairs 415 may be configured to carry high data-rate signals (e.g., signals carrying data rates over 25 Gb/sec with PAM4 encoding) or high-frequency signals (e.g., over 56 or 112 Gb/sec), according to some implementations. There may also be one or more single-trace conductors 416 and one or more common conductors 407. A single-trace conductor 416 may carry low-frequency signals (e.g., frequencies less than 500 MHz), lower data-rate signals (e.g., less than 100 Mb/s), logic control signals, a bias potential, or a reference potential according to some embodiments. A common conductor 407 may have more than one tail 220 and more than one mating contact portion 230. A common conductor 407 may carry DC power. Additionally or alternatively, a common conductor 407 may carry other high current and low frequency signal.

A lead frame 410 may be stamped or cut from a metal sheet, according to some embodiments. Metals used for a lead frame may include, but are not limited to, copper or copper alloys, such as phosphor-bronze, chrome-plated copper, or beryllium copper, or aluminum, chrome-plated aluminum, aluminum alloys, etc. When stamped or cut, there may be tie bars 409 that temporarily hold the conductors 405 apart in a fixed spacing relationship. The tie bars 409 may be small pieces of metal connected between adjacent conductors 405. During or after a subsequent over-molding step, at least a portion of one or more tie bars 409 may be cut and/or removed to electrically isolate one or more of the plurality of conductors 405.

Figure 4B:
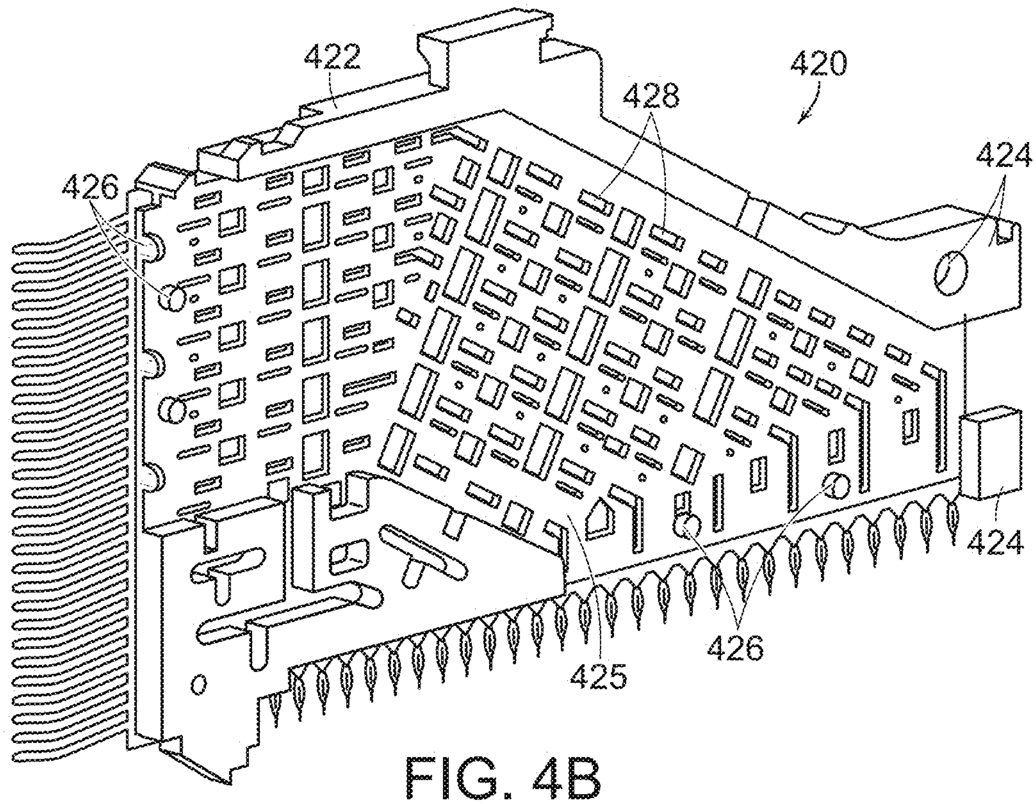
FIG. 4B is a front side view of an exemplary lead frame of FIG. 4A overmolded with insulative material.

An example of an over-molded lead frame 420 is depicted in FIG. 4B. According to some embodiments, one or more over-molding processes may be performed to form an insulative plastic over-mold 422 over one or both sides of the lead frame 410. As an example, the lead frame 410 may be placed in or against a mold and the plastic injected into the mold such that the plastic flows into contact with one or both sides of the lead frame 410. Various types of plastics may be used such as, but not limited to, liquid crystal polymers (LCPs), polyphenyline sulfide (PPS), high temperature nylon or polyphenylenoxide (PPO) or polypropylene (PP). Other suitable materials may also be employed. In some cases, the plastic may be a thermoset plastic. In some cases, the insulative plastic may include insulative reinforcing material such as glass fibers. The conductivity of an insulative plastic over-mold 422 may be very low, such as 0.01 Seimens/meter or less.

According to some embodiments, an over-mold may include one or more registration features 424, 426. The registration features may help align the lead frame 410 and insulative over-mold 422 to other components within the wafer 250*c* and/or help align the wafer 250*c* to one or more adjacent wafers 250*d*, 250*b*. Some of the registration features 424, 426 may extend away from the lead frame and/or out of the plane of the lead frame and beyond a planar surface 425 of the insulative over-mold 422. Some registration features may comprise holes or depressions in the insulative over-mold 422 into which mating registration features on an adjacent wafer may insert. Some registration features 426 may aide alignment of a metal shield (shown in FIG. 4C) to the insulative over-mold 422 and lead frame 410. The insulative over-mold 422 may also include holes or openings 428 that extend to the lead frame 410. Some openings 428 may align with openings 413 in the reference conductors 412 of the lead frame 410. Such openings 428 may enable lossy material to flow through openings 413, for example, to electrically connect the reference conductors 412 via the lossy material. Some openings in the insulative over-mold 422 may align with tie bars 409 on the lead frame 410 and allow at least a portion of the tie bars to be removed or severed.

Figure 4C:
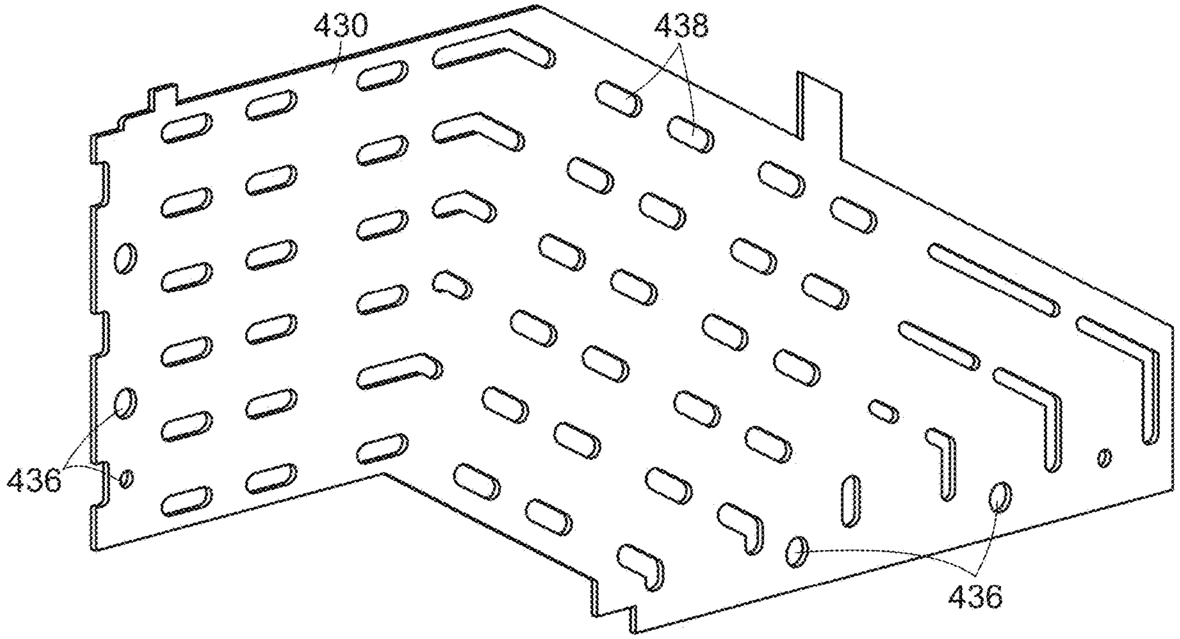
FIG. 4C is a front side view of an exemplary metal shield that may be included in a wafer, according to some embodiments.
Figure 4D:
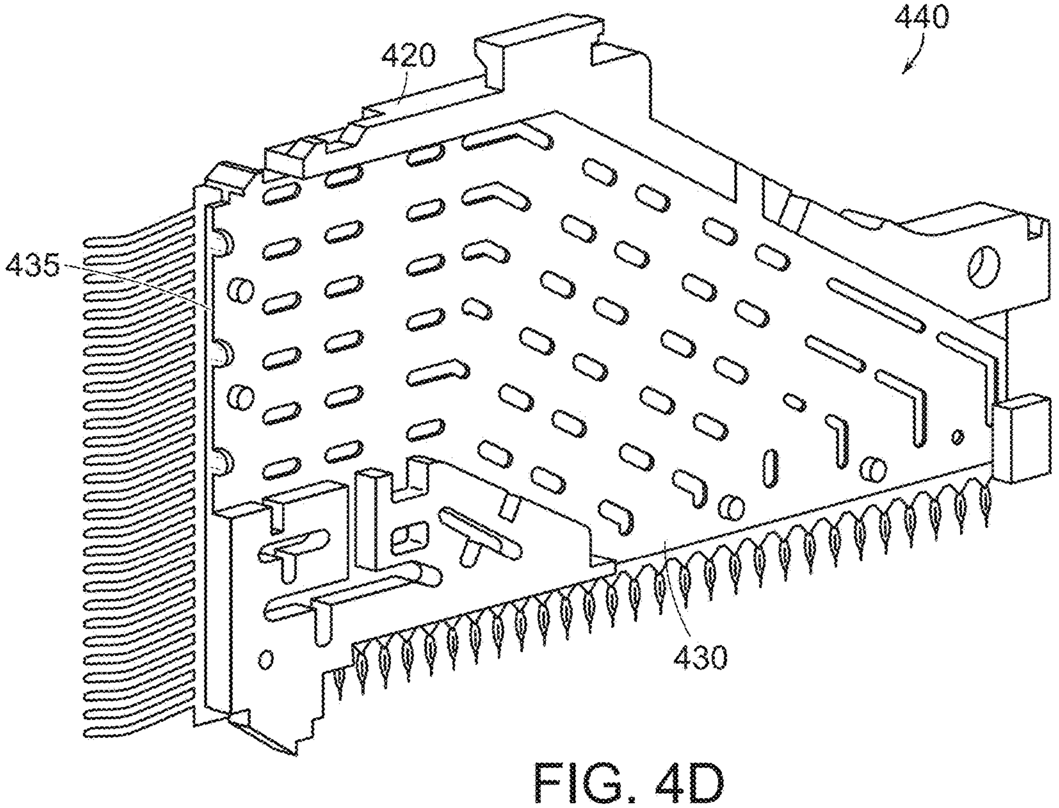
FIG. 4D is a front side view of the metal shield of FIG. 4C mounted in insulative material of FIG. 4B, according to some embodiments.

Wafers 250 of a card edge connector 200 may include one or more metal shields 430 located adjacent to the lead frame's conductors 405 and separated from the conductors by a layer 435 of insulative material in the insulative over-mold 422. An example of a metal shield 430 is depicted in FIG. 4C, and its mounting in a portion of a wafer assembly 440 is shown in FIG. 4D. In some cases, the metal shield may be electrically connected to a reference potential, such as ground. The metal shield 430 may be stamped or cut from a metal sheet, according to some embodiments. Example metals that may be used for the metal shield 430 include, but are not limited to, copper or copper alloys, such as phosphor-bronze, chrome-plated copper, or beryllium copper, or stainless steel, aluminum, chrome-plated aluminum, aluminum alloys, etc. According to some embodiments, a metal shield 430 may include registration holes or openings 436 that fit over registration features 426 on the insulative over-mold 422. A metal shield 430 may also include openings 438 that align with openings 413 in the reference conductors 412 and openings 428 in the insulative over-mold 422. These aligned openings may allow electrically conductive or lossy material to flow from the metal shield 430 to the reference conductors 412.

According to some embodiments, a metal shield 430 may be sized such that it is located adjacent to only high-speed differential pairs 415 in a multi-row connector, as depicted in FIG. 4D. In other embodiments, the metal shield 430 may be located adjacent to additional conductors 405 in a card edge connector 200, such as single-trace conductors 416 and/or common conductors 407.

Figure 4E:
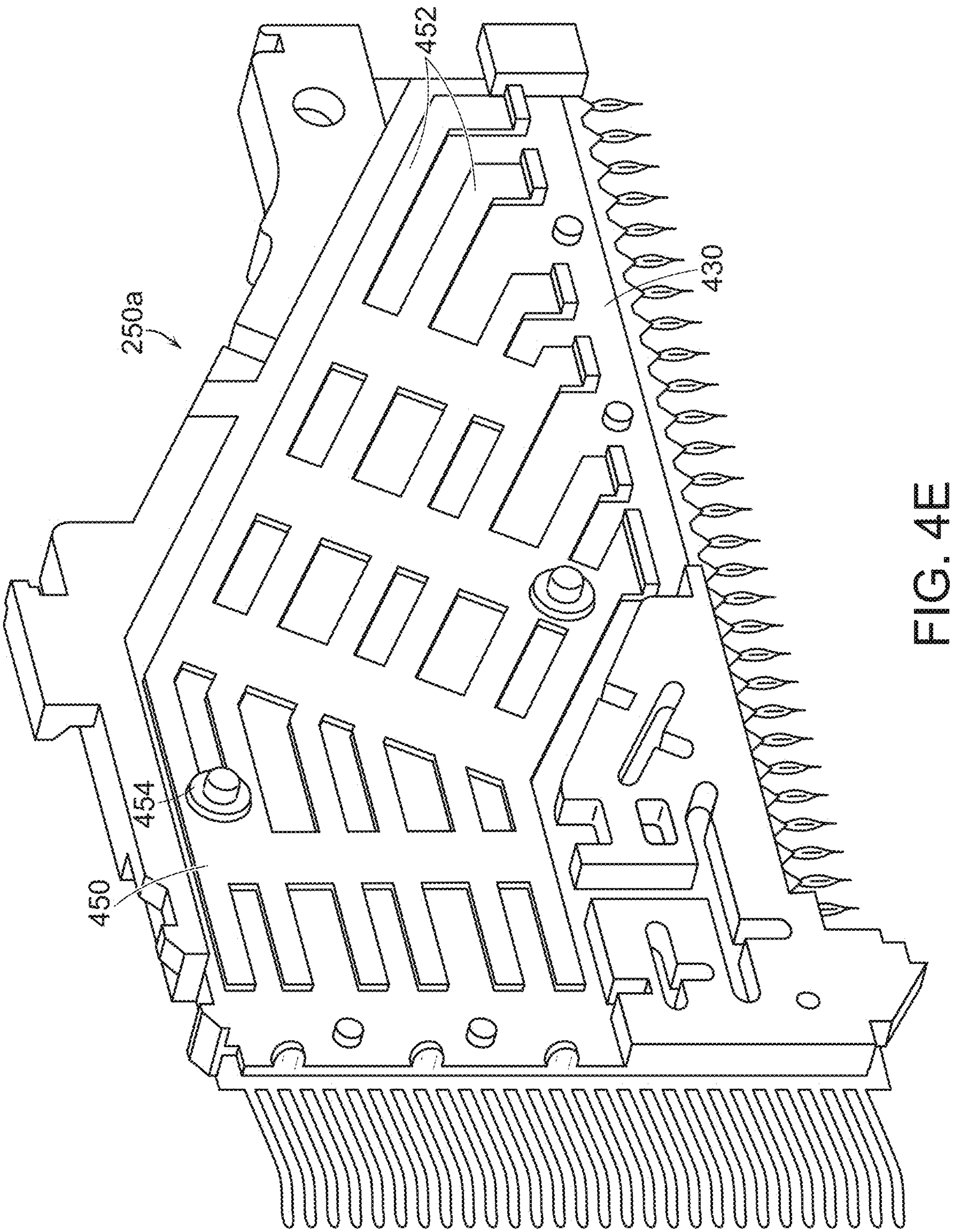
FIG. 4E is a front side view of a wafer formed by molding lossy material over the metal shield of FIG. 4C, according to some embodiments.

One or more wafers 250 of a card edge connector 200 may also include electrically conductive and lossy material 450, as illustrated in FIG. 4E. The lossy material 450 may be applied over the more highly conductive metal shield 430 using an over-molding process (e.g., using injection molding techniques), according to some embodiments. In some cases, the lossy material 450 may be applied to form ribs or strips or a web pattern having strips 452. The strips may be located between differential pairs 415 of the conductors and may, for example, be aligned with reference conductors 412. Inclusion of the conductive metal shield 430 and the lossy material 450 in certain locations may enable operation of differential pairs 415 in the connector 200 at very high data rates (e.g., up to 56 Gb/s with PAM4 encoding in some cases, up to 112 Gb/s in some cases, or up to 160 Gb/s in some cases). The metal shield 430 and lossy material 450 may provide effective isolation of the signal conductors at very high frequencies and data rates. For example, lossy material 450 coupled to reference conductors 412 and the metal shield 430 may help reduce resonances that might otherwise occur and thereby reduce cross-talk between differential pairs 415.

Any suitable lossy material may be used for the lossy material 450 of the card edge connector 200. Materials that conduct, but with some loss, or material which by another physical mechanism absorbs electromagnetic energy over the frequency range of interest are referred to herein generally as "lossy" materials. Frequency ranges of interest may be between 500 MHz and 160 GHz, though lower frequencies (e.g., down to 50 MHz) and higher frequencies may be of interest in some cases.

Electrically lossy materials may be formed from lossy dielectric and/or poorly conductive and/or lossy magnetic materials. Magnetically lossy material may be formed, for example, from materials traditionally regarded as ferromagnetic materials, such as those that have a magnetic loss tangent greater than approximately 0.05 in the frequency range of interest. The magnetic loss tangent is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest.

Electrically lossy material may be formed from material traditionally regarded as dielectric materials, such as those that have an electric loss tangent greater than approximately 0.05 in the frequency range of interest. The electric loss tangent is the ratio of the imaginary part to the real part of the complex electrical permittivity of the material. Electrically lossy materials may also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 10,000 Siemens/meter (or between these values), or about 1 Siemen/meter to about 5,000 Siemens/meter (or between these values). In some embodiments, material with a bulk conductivity of between about 10 Siemens/meter and about 200 Siemens/meter may be used (or between these values). As a specific example, material with a conductivity between 40 Siemens/meter and 60 Siemens/meter may provide significantly improved results for a frequency range of interest. However, it should be appreciated that the conductivity of the material may be selected empirically or through electrical simulation using known simulation tools to determine a suitable conductivity that provides a suitably low crosstalk with a suitably low signal path attenuation or insertion loss.

Electrically lossy materials may be partially conductive materials, such as those that have a surface resistivity between 1Ω/square and 100,000Ω/square (or between approximately these values). In some embodiments, the electrically lossy material has a surface resistivity between 10Ω/square and 1000Ω/square (or between approximately these values). As a specific example, the material may have a surface resistivity of between 20Ω/square and 80 Ω/square and may provide significantly improved results for a frequency range of interest.

In some embodiments, lossy material 450 is formed by adding to a polymeric binder a filler that contains conductive particles. In such an embodiment, lossy material 450 may be applied and formed by molding or otherwise shaping the binder-filler mix into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

The binder may be any material that will set, cure, be impregnated with, or may otherwise be used to retain the filler material. The binder may be regarded as a matrix material in which the filler is dispersed to create electrically and/or magnetically lossy material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies or resins, may serve as a binder. Materials such as thermosetting resins or adhesives may also be used.

Also, while the above described binder materials may be used to create an electrically and/or magnetically lossy material by forming a binder around conducting particle fillers, the utility model is not so limited. For example, conducting particles may be impregnated into a formed matrix material or may be coated onto a formed matrix material, such as by applying a conductive coating to a plastic, ceramic, or a metallic component. In some cases, lossy material 450 may be formed by plating a lossy coating, such as a diffuse metal coating, onto plastic or other insulative material. As used herein, the term "binder" encompasses a material that encapsulates the filler, is impregnated with the filler, or otherwise serves as a substrate to hold the filler.

In some embodiments, the fillers will be present in a sufficient volume percentage to allow conducting paths to be created from particle to particle. For example, when metal fiber is used, the fiber may be present at a value between 3% and 40% by volume. In some cases, the conductive filler may comprise any value between 5% by weight and 70% by weight of the formed lossy material 450. The amount of filler may impact the conducting properties of the material.

In some embodiments, filled materials that may be used as the lossy material 450 may be purchased commercially, such as materials sold under the trade name Celestran® by Celanese Corporation which may be filled with carbon fibers or stainless-steel filaments. Such a preform may include an epoxy binder filled with carbon fibers and/or other carbon particles. The binder surrounds carbon particles, which act as a reinforcement for the preform. In some embodiments, the preform may adhere (e.g., to the metal shield 430 and reference conductors 412) through the adhesive component in the preform, which may be cured in a heat treating process. In some embodiments, a separate conductive or non-conductive adhesive layer may be used to adhere the lossy material 450 to one or more components of a card edge connector 200. In some embodiments, the adhesive in the preform may be used to secure one or more connector components, such as foil strips, to the lossy material.

Various forms of reinforcing fiber, in woven or non-woven form, coated or non-coated may be used as filler for the lossy material 450. Non-woven carbon fiber is one suitable material. Other suitable materials, such as custom blends as sold by RTP Company, may be employed, as the present utility model is not limited in this respect.

In some embodiments, lossy material 450 of a card edge connector 200 may be formed by stamping a preform or sheet of lossy material. For example, a desired pattern of lossy material 450 for a connector may be formed by stamping a preform or filled binder, as described above, with an appropriate topographical pattern. However, other materials may be used instead of or in addition to such a preform. A sheet of ferromagnetic material, for example, may be used.

Lossy material 450 may be formed in other ways. In some embodiments, lossy material may be formed by interleaving layers of lossy and conductive material, such as metal foil, and layers of insulative binder. These layers may be adhered to one another, such as through epoxy or other adhesive present in the binder, or may be held together in any other suitable way. In some cases, the interleaved layers may be of a desired shape before being secured to one another or may be stamped or otherwise shaped after they are held together.

FIGS. 4A to 4E illustrate steps in manufacturing a wafer 250*a*. Similar steps may be employed to manufacture wafer 250*b*, except that the lead frame for wafer 250*b* may have mating contact portions with contact surfaces facing in the opposite direction. Further, in molding the housing for wafer 250*b*, it may have features complementary to those shown for wafer 250*a*. For example, in placed of projections 454, wafer 250*b* may have holes that receive projections 454, such that wafers 250*a* and 250*b* may interlock. In this example, projections 454 are formed of the lossy material such that the lossy material of the two wafers 250*a* and 250*b* is interconnected.

Similar manufacturing steps may be used to form outer wafers, such as wafers 250*c* and 250*d*. The lead frames used for such wafers may have a different number and/or shape of conductors relative to lead frame 410. The tails 220 of those lead frames may be configured to be in rows 252*c* and 252*d* that are outside of the rows 252*a* and 252*b* of wafers 250*a* and 250*b*, for example. The mating contact portions of the lead frames for outer wafers 250*c* and 250*d* may be in line with the mating contact portions of respective shorter wafers 250*a* and 250*b*.

Such a configuration may result from a jog in the lead frame used in the manufacture of outer wafers 250*c* and 250*d*. In contrast to lead frame 410, which is generally planar, the lead frame for outer wafers 250*c* and 250*d* may jog in the direction in which the mating surfaces of the mating contact portions face. Such a jog may be introduced in a metal forming operation. The jogged portions may extend through an offset portion, such as offset portion 317.

The lead frame for the outer wafers 250*c* and 250*d* may be incorporated into a wafer housing. That operation may be performed using any of the techniques described as suitable for manufacturing short wafers 250*a* and 250*b*. For example, the lead frame may be overmolded with an insulative housing. The housing of outer wafers 250*c* and 250*d* may be shaped such that two interlocked short wafers may be held between the outer wafers. To support this configuration, the wafer housings of either or both of outer wafers 250*c* and 250*d* may be formed with sidewalls 254 (FIG. 3), that bound a cavity in which short wafers 250*a* and 250*b* are received.

Similarly, a shield 256 may be incorporated into outer wafers 250*c* and 250*d*. As with the shields 430, the shields 256 may be secured with a second shot 258 (FIG. 3) in a molding operation. That second shot may be of an insulative material. Alternatively, the second shot may be lossy material, and may mechanically hold the shield in place as well as provide a lossy connections between the shield 256 and other structures within the connector designed to be grounded in use. The lossy insert, for example, may contact and/or pass thorough reference conductors in the lead frame.

Figure 5:
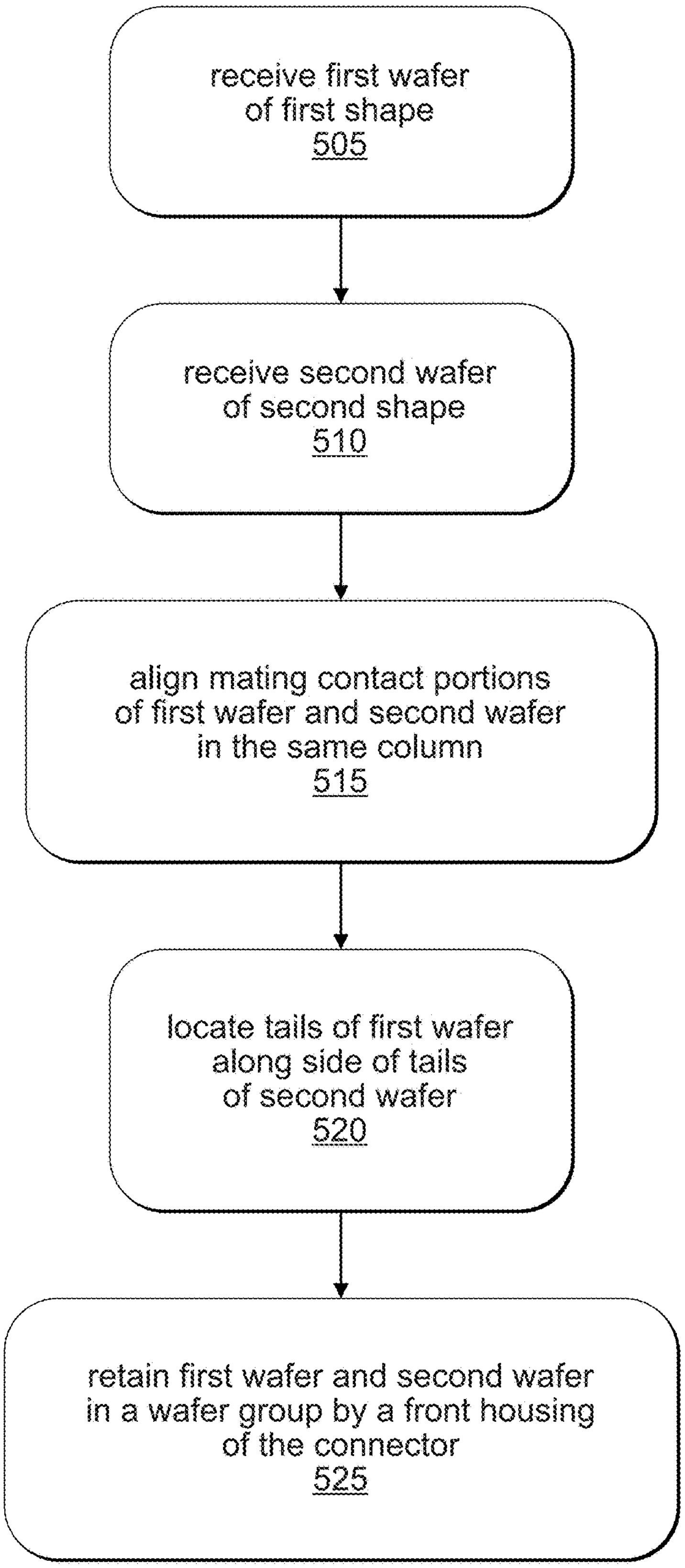
FIG. 5 illustrates acts associated with methods for making a card edge connector, according to some embodiments.

An example flow diagram having acts associated with methods of assembling a card edge connector is illustrated in FIG. 5. An implemented method may contain more acts than those shown or fewer acts than those shown. In some implementations, acts shown may be performed in a different order, and are not limited to the order illustrated in FIG. 5.

Some methods of assembling a card edge connector 200 may include receiving (act 505) a first wafer of a first shape. For example, the first wafer may be a wafer 250*a* of an orthogonal card edge connector having a first shape, as depicted in FIG. 3. A method may further include receiving (act 510) a second wafer having a second shape that is different from the first shape. Continuing with the example of FIG. 3, the second wafer may be an outer wafer 250*c* having a different shape from the first wafer 250*a*. A method may then include aligning (act 515) mating contact portions of the first wafer and second wafer in a same column. For example, the mating contact portions 324, 326 of the first and second wafers 250*a*, 250*c* may align into a single column when the two wafers are positioned side-by-side. The mating contact portions 324, 326 may then lie along a single line in the connector. Additionally, a method may include locating (act 520) a row of tails of the first wafer alongside a row of tails of the second wafer. For example and referring again to FIG. 3, the row of tails of the second wafer 250*c* may lie alongside the row of tails of the first wafer when the first wafer 250*a* and second wafer 250*c* are positioned side-by-side. The first wafer and second wafer may be retained (act 525) in a wafer group, at least in part, by a front housing of the connector, according to some embodiments. In some cases, there may be additional wafers retained in the wafer group.

In this way, a set of conductive elements may be arranged such that a single column of mating contact portions connects to multiple rows of contact tails at the mounting interface.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, connector design techniques are shown applied to a right angle, card edge connector. Similar techniques may be applied to connectors of other configurations, such as a vertical connector and/or a two-piece connector.

As an example of another variation, wafers were designed as being manufactured by a two-shot overmolding operation, in which insulative material is overmolded in one shot and lossy plastic is overmolded as a second shot. It should be appreciated that more or less than two shots may be used or, in some embodiments, a wafer may be made without overmolding. In some embodiments, for example, lossy material may be omitted, such that a one-shot overmolding operation may be suitable. Alternatively, lossy material may be separately molded as discrete members that are subsequently inserted into openings in an insulative overmold. As yet another example of a variation, the insulative housing of the wafer may be molded as a separate member and the conductors may be inserted into openings in the insulative housing.

Further, it was described that inner wafers may be configured for use in a conventional connector or combined with outer wafers in a multi-row connector as described herein. A multi-row connector may be formed of inner and outer wafers, regardless of whether the inner wafers are used in a connector of conventional design.

Moreover, it is described that two wafers, an inner and an outer wafer, cooperate to form one column of conductive elements at a mating interface of the connector. Other embodiments may be formed with 3 or more wafers per column.

Alternatively, a single column may be formed with a single subassembly. Such a subassembly may be formed, for example, by insert molding an insulative housing around conductors that form one row and inserting conductors that form a second row into that insulative housing. As yet another variation, the conductors of one row may be inserted in one side of the housing, and conductors of a second row may be inserted in an opposite side of the housing.

It should also be appreciated that location or orientation of connector features are described relative to a printed circuit board. One of skill in the art may appreciate that the connector need not be mounted to the printed circuit board in order for the location or orientation to be recognized. Rather, the location or orientation may be determined relative to the connector mating and mounting interface, which may be configured to be mounted in a predetermined orientation relative to the printed circuit board.

EXAMPLES

Some embodiments relate to a connector for mounting to a peripheral region of a printed circuit board. The connector may comprise a plurality of conductors, each conductor comprising a tail configured for connection to the printed circuit board when the connector is attached to the printed circuit board and a mating contact portion. The mating contact portions of the plurality of conductors may be arranged in M columns configured to extend perpendicularly from a surface of the printed circuit board when the connector is attached to the printed circuit board. The tails of the plurality of conductors may be arranged in N rows positioned for connection to mounting features on the printed circuit board, wherein N and M are integers and N>M.

In some embodiments, the tails may not extend more than 35 mm from an edge of the printed circuit board when the connector is mounted to the peripheral region of the printed circuit board.

In some embodiments, the connector may comprise a front housing with a slot configured to receive an edge of a card and the M columns may comprise a first column disposed on a first side of the slot and a second column disposed on a second side of the slot.

In some embodiments, a first plurality of the tails may be arranged along a first line, a first plurality of the mating contact portions that mate to the first plurality of tails may be arranged along a second line, and extensions of the first line and the second line cross but may be offset from each other by a distance at their closest approach.

In some embodiments, the connector may further comprise a first wafer to which the first plurality of tails and the first plurality of mating contact portions may be attached.

In some embodiments, a first portion of the plurality of the conductors that electrically connect the first plurality of tails and the first plurality of mating contact portions may include at least two differential conductor pairs separated by a reference conductor.

In some embodiments, the connector may further comprise a second wafer to which a second plurality of the tails and a second plurality of the mating contact portions may be attached. The connector may comprise electrically conductive and lossy material for signals having data rates over 1 GHz, the lossy material located between the first wafer and the second wafer.

In some embodiments, the lossy material may extend through holes in reference conductors of the plurality of conductors.

In some embodiments, the connector may further comprise a common conductor that may electrically connect two or more tails and two or more mating contact portions of the connector, wherein the tails are arranged sequentially in one of the N rows.

In some embodiments, the first plurality of the tails may be compliant pins.

In some embodiments, an electronic system may comprise a printed circuit board, a card having contact pads on one or more surfaces, and a connector mounted to a peripheral region of the printed circuit board and configured to electrically connect circuitry on the card to circuitry on the printed circuit board. The connector may comprise a plurality of conductors, each conductor comprising a tail configured for connection to the printed circuit board and a mating contact portion, wherein the mating contact portions of the plurality of conductors may be arranged in M columns configured to extend perpendicularly from a surface of the printed circuit board, and wherein the tails of the plurality of conductors may be arranged in N rows and connect to mounting features on the printed circuit board, wherein N and M are integers and N>M.

In some embodiments, the connector may be further configured to electrically connect circuity on one or more additional cards to circuitry on the printed circuit board.

In some embodiments, the connector may space the cards apart in an essentially parallel arrangement.

In some embodiments, the card may be a memory card or an add-in card.

In some embodiments, the electronic system may be included in a network server.

In some embodiments, an end of the card may insert into the connector such that the contact pads on the one or more surfaces of the card contact the mating contact portions of the conductors of the connector.

In some embodiments, the connector may extend no more than 35 mm from an edge of the printed circuit board.

Some embodiments relate to a connector for connecting a card to a peripheral region of a printed circuit board. The connector may comprise a first wafer having a first shape and a first plurality of conductors that extend perpendicularly from a surface of the printed circuit board when the connector is attached to the printed circuit board. The connector may further comprise a second wafer having a second shape that is different from the first shape and having a second plurality of conductors arranged to extend perpendicularly from the surface of the printed circuit board when the connector is attached to the printed circuit board. The conductors of the first and second wafers may comprise tails configured for connection to the printed circuit board and mating contact portions. A first plurality of the mating contact portions connected to at least a portion of the first plurality of conductors may be aligned in a front housing of the connector with a second plurality of the mating contact portions connected to at least a portion of the second plurality of conductors.

In some embodiments, the first plurality of the mating contact portions and the second plurality of the mating contact portions may form a single column of mating contact portions that extends perpendicularly from the surface of the printed circuit board when the connector is attached to the printed circuit board.

In some embodiments, the first plurality of the mating contact portions may be located a first distance from the printed circuit board when the connector is attached to the printed circuit board and the second plurality of the mating contact portions may be located a second distance from the printed circuit board that is greater than the first distance when the connector is attached to the printed circuit board.

In some embodiments, the connector may further comprise first insulative material of the first wafer that supports the first plurality of conductors and second insulative material of the second wafer that supports the second plurality of conductors. A portion of the second insulative material may extend over and abut an edge of the first insulative material when the first wafer and the second wafer are assembled in the connector.

In some embodiments, the connector may further comprise a metal shield located between the first wafer and the second wafer when the first wafer and the second wafer are assembled in the connector and electrically conductive and lossy material for signals having data rates over one gigabit per second. The electrically conductive and lossy material may be located between the first wafer and the second wafer and contacting the metal shield when the first wafer and the second wafer are assembled in the connector.

In some embodiments, the electrically conductive and lossy material may extend through holes in some of the first plurality of conductors.

Some embodiments relate to a wafer for a connector that mounts to a peripheral region of a printed circuit board. The wafer may comprise a plurality of conductors, each conductor comprising a tail configured for connection to the printed circuit board when the connector is attached to the printed circuit board and a mating contact portion. The mating contact portions may lie in a first plane and may be arranged to extend perpendicularly from a surface of the printed circuit board when the connector is attached to the printed circuit board. The tails may lie in a second plane that is parallel to and offset from the first plane.

In some embodiments, the wafer may further comprise insulative material that supports the plurality of conductors, wherein the insulative material may include a first portion near the tails and a second portion near the mating contact portions that is offset from the first portion in a direction perpendicular to the second plane.

In some embodiments, the mating contact portions may be supported a distance from the surface of the printed circuit board when the connector is attached to the printed circuit board, such that a plurality of mating contact portions of the second wafer may be aligned with the mating contact portions of the wafer between the mating contact portions of the wafer and the printed circuit board.

In some embodiments, the second portion may extend over a second wafer when the second wafer is abutted to the first portion and wherein the mating contact portions align with mating contact portions of the second wafer.

In some embodiments, a connector may comprise a plurality of conductors, each conductor comprising a tail configured for connection to a printed circuit board when the connector is attached to the printed circuit board and a mating contact portion. The mating contact portions may lie along a first line that extends perpendicularly from a surface of the printed circuit board when the connector is attached to the printed circuit board. A first plurality of the tails may be configured for connection to the surface of the printed circuit board along a second line, and a second plurality of the tails may be configured for connection to the surface of the printed circuit board along a third line that is different than the second line.

In some embodiments, the second line and third line may be arranged side-by-side and may be parallel to each other.

In some embodiments, a first portion of the mating contact portions and the first plurality of tails may extend from a first wafer and a second portion of the mating contact portions and the second plurality of tails may extend from a second wafer, the first wafer and the second wafer may be assembled in the connector.

In some embodiments, the second portion of the mating contact portions may be farther from the first plurality of tails than the first portion of the mating contact portions.

In some embodiments, the second portion of the mating contact portions may extend from an offset portion of the second wafer that extends over the first wafer.

In some embodiments, at least four of the mating contact portions may connect to two differential pair of conductors that are separated by a reference conductor.

In some embodiments, the connector may further comprise lossy material that contacts the reference conductor.

In some embodiments, the connector may be included in a server.

In some embodiments, a connector may comprise a plurality of conductors having tails and mating contact portions at opposing ends. Two or more rows of the tails that may be arranged side-by-side, wherein the tails may be configured for connection to a printed circuit board, and wherein the mating contact portions may be arranged in one column that extends vertically from a surface of the printed circuit board when the connector is attached to the printed circuit board.

In some embodiments, the connector may be configured to mount to a peripheral region of the printed circuit board and the tails may not extend more than 35 mm from an edge of the printed circuit board.

In some embodiments, at least four of the conductors may comprise differential pairs that are separated by a reference conductor.

In some embodiments, the connector may further comprise ribs of lossy material formed over a metal shield that is adjacent to a plurality of the conductors, wherein at least one of the ribs of the lossy material may electrically contact the reference conductor.

In some embodiments, the mating contact portions may extend from two different wafers that are assembled in the connector.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A connector for mounting to a peripheral region of a printed circuit board, the connector comprising:

a plurality of conductors, each comprising a tail configured for connection to the printed circuit board when the connector is attached to the printed circuit board and a mating contact portion, wherein the mating contact portions of the plurality of conductors are arranged in M columns configured to extend perpendicularly from a surface of the printed circuit board when the connector is attached to the printed circuit board, wherein each column of the M columns comprises a first group of mating contact portions and a second group of mating contact portions positioned further from the printed circuit board than the first group, and wherein the tails of the plurality of conductors are arranged in N rows positioned for connection to mounting features on the printed circuit board, wherein:

N and M are integers;

N>M;

the first group of mating contact portions of each column is connected to a respective first row of tails; and the second group of mating contact portions of each column is connected to a respective second row of tails.

2. The connector of claim 1, wherein the connector comprises a front housing with a slot configured to receive an edge of a card and the M columns comprise a first column disposed on a first side of the slot and a second column disposed on a second side of the slot.

3. The connector of claim 1, wherein:

a first plurality of the tails are arranged along a first line;

a first plurality of the mating contact portions that mate to the first plurality of tails are arranged along a second line; and extensions of the first line and the second line cross but are offset from each other by a distance at their closest approach.

4. The connector of claim 3, further comprising a first wafer to which the first plurality of tails and the first plurality of mating contact portions are attached.

5. The connector of claim 3, wherein a first portion of the plurality of the conductors that electrically connect the first plurality of tails and the first plurality of mating contact portions include at least two differential conductor pairs separated by a reference conductor.

6. The connector of claim 1, further comprising a common conductor that electrically connects two or more tails and two or more mating contact portions of the connector, wherein the tails are arranged sequentially in one of the N rows.

7. The connector of claim 1, wherein the first plurality of the tails are compliant pins.

8. A connector for mounting to a peripheral region of a printed circuit board, the connector comprising:

a plurality of conductors, each comprising a tail configured for connection to the printed circuit board when the connect is attached to the printed circuit board and a mating contact portion, wherein:

the mating contact portions of the plurality of conductors are arranged in M columns configured to extend perpendicularly from a surface of the printed circuit board when the connector is attached to the printed circuit board, the tails of the plurality of conductors are arranged in N rows positioned for connection to mounting features on the printed circuit board, where N and M are integers and N>M, and wherein, the tails do not extend more than 35 mm from an edge of the printed circuit board when the connector is mounted to the peripheral region of the printed circuit board.

9. The connector of claim 8, wherein the plurality of conductors comprises at least 84 conductors and M is 2.

10. The connector of claim 8, wherein a height of the connector is between 30 mm and 42 mm.

11. The connector of claim 8, wherein a contact density of the connector is greater than 2 contacts/mm.

12. The connector of claim 4, further comprising:

a second wafer to which a second plurality of the tails and a second plurality of the mating contact portions are attached; and electrically conductive and lossy material for signals having data rates over 1 GHz, the lossy material located between the first wafer and the second wafer.

13. The connector of claim 12, wherein the lossy material extends through holes in reference conductors of the plurality of conductors.

14. A connector for connecting a card to a peripheral region of a printed circuit board, the connector comprising:

a first wafer having a first shape and a first plurality of conductors that extend perpendicularly from a surface of the printed circuit board when the connector is attached to the printed circuit board; and a second wafer having a second shape that is different from the first shape and having a second plurality of conductors arranged to extend perpendicularly from the surface of the printed circuit board when the connector is attached to the printed circuit board, wherein the conductors of the first and second wafers comprise tails configured for connection to the printed circuit board and mating contact portions, and wherein a first plurality of the mating contact portions connected to at least a portion of the first plurality of conductors are aligned in a front housing of the connector on a first side of the front housing with a second plurality of the mating contact portions connected to at least a portion of the second plurality of conductors.

15. The connector of claim 14, wherein the first plurality of the mating contact portions and the second plurality of the mating contact portions form a single column of mating contact portions that extends perpendicularly from the surface of the printed circuit board when the connector is attached to the printed circuit board.

16. The connector of claim 14, wherein the first plurality of the mating contact portions are located a first distance from the printed circuit board when the connector is attached to the printed circuit board and the second plurality of the mating contact portions are located a second distance from the printed circuit board that is greater than the first distance when the connector is attached to the printed circuit board.

17. The connector of claim 14, further comprising:

first insulative material of the first wafer that supports the first plurality of conductors; and second insulative material of the second wafer that supports the second plurality of conductors, wherein a portion of the second insulative material extends over and abuts an edge of the first insulative material when the first wafer and the second wafer are assembled in the connector.

18. The connector of claim 17, further comprising:

a metal shield located between the first wafer and the second wafer when the first wafer and the second wafer are assembled in the connector; and electrically conductive and lossy material for signals having data rates over one gigabit per second, the electrically conductive and lossy material located between the first wafer and the second wafer and contacting the metal shield when the first wafer and the second wafer are assembled in the connector.

19. The connector of claim 17, further comprising:

electrically conductive and lossy material extending through holes in some of the first plurality of conductors.

20. A connector comprising:

a plurality of conductors, each comprising a tail configured for connection to a printed circuit board when the connector is attached to the printed circuit board and a mating contact portion, wherein:

the mating contact portions lie along a first line that extends perpendicularly from a surface of the printed circuit board when the connector is attached to the printed circuit board, a first plurality of the tails are configured for connection to the surface of the printed circuit board along a second line, and a second plurality of the tails are configured for connection to the surface of the printed circuit board along a third line that is different than the second line, and wherein a first portion of the mating contact portions and the first plurality of tails extend from a first wafer and a second portion of the mating contact portions and the second plurality of tails extend from a second wafer, the first wafer and the second wafer assembled in the connector.

21. The connector of claim 20, wherein the second line and third line are arranged side-by-side and are parallel to each other.

22. The connector of claim 20, wherein the second portion of the mating contact portions are farther from the first plurality of tails than the first portion of the mating contact portions.

23. The connector of claim 20, wherein the second portion of the mating contact portions extend from an offset portion of the second wafer that extends over the first wafer.

24. The connector of claim 20, wherein at least four of the mating contact portions connect to two differential pair of conductors that are separated by a reference conductor.

25. The connector of claim 24, further comprising lossy material that contacts the reference conductor.

26. A server comprising the connector of claim 20.

* * * * *